(12) United States Patent
Ball et al.

(10) Patent No.: US 12,033,025 B2
(45) Date of Patent: Jul. 9, 2024

(54) TOUCHLESS UTILITY CONTROLLER

(71) Applicant: WCM Industries, Inc., Colorado Springs, CO (US)

(72) Inventors: William T. Ball, Colorado Springs, CO (US); Eric Pilarczyk, Colorado Springs, WA (US); Gabriel Young, Colorado Springs, WA (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 18/170,802

(22) Filed: Feb. 17, 2023

(65) Prior Publication Data

US 2023/0274111 A1    Aug. 31, 2023

Related U.S. Application Data

(60) Provisional application No. 63/325,363, filed on Mar. 30, 2022, provisional application No. 63/314,150, filed on Feb. 25, 2022.

(51) Int. Cl.
    *G06K 7/10*      (2006.01)
    *G06K 19/07*     (2006.01)

(52) U.S. Cl.
    CPC ..... *G06K 7/10366* (2013.01); *G06K 19/0723* (2013.01)

(58) Field of Classification Search
    CPC ........... G06K 7/10366; G06K 19/0723; G06K 17/0022; H04B 5/0062; G06Q 50/06
    See application file for complete search history.

(56) References Cited

U.S. PATENT DOCUMENTS

| | | | |
|---|---|---|---|
| 2012/0234409 A1 | 9/2012 | Klicpera | |
| 2012/0306621 A1* | 12/2012 | Muthu | H05B 47/19 340/10.5 |
| 2014/0313016 A1* | 10/2014 | Nizam | G06K 7/10297 340/10.5 |
| 2015/0315008 A1 | 11/2015 | Locke et al. | |

(Continued)

FOREIGN PATENT DOCUMENTS

EP    2700854 A2    2/2014

OTHER PUBLICATIONS

CN 215067750U—A valid period reminding device of color indication, 5 pages. (Year: 2023).*

(Continued)

*Primary Examiner* — Tuyen K Vo

(57) ABSTRACT

A touchless utility controller is provided. In examples, the utility controller comprises a housing encompassing circuitry configured to receive a signal, and based on the received signal, provide an activation signal to a valve control device for a valve. The housing may comprise a face having an illuminated portion to allow for a visual indictor to illuminate the illuminated portion, wherein the face does not include any physically activated interface elements. In addition, the housing may include at least one of an outer side perimeter connected to the face or a back side, wherein at least one of the outer side perimeter or the back side defines at least one through hole for receiving a input power wiring and output transmission wires for connecting to the valve control device for the valve controlling one of gas or water.

18 Claims, 8 Drawing Sheets

(56) References Cited

U.S. PATENT DOCUMENTS

2015/0370225 A1* 12/2015 McCune ................. G05B 9/02
                                                   700/293
2019/0151879 A1   5/2019 Cortland et al.
2019/0280507 A1*  9/2019 Dallas ...................... B25F 5/00
2022/0260084 A1*  8/2022 Mariano ............. F04D 27/0269

OTHER PUBLICATIONS

KR 20170091421A—Gas Metering Systems and Gas Control Method Thereof, 9 pages. (Year: 2023).*
KR 20100059149—Apparatus and Method for Safety Precaution for Gas or Electric Apparatus, 6 pages. (Year: 2023).*
JP 2018526953A, 9 pages. (Year: 2023).*
European Search Report for EP Application No. 23158356.8 mailed Jul. 17, 2023 (8 pages).

* cited by examiner

FIG. 4
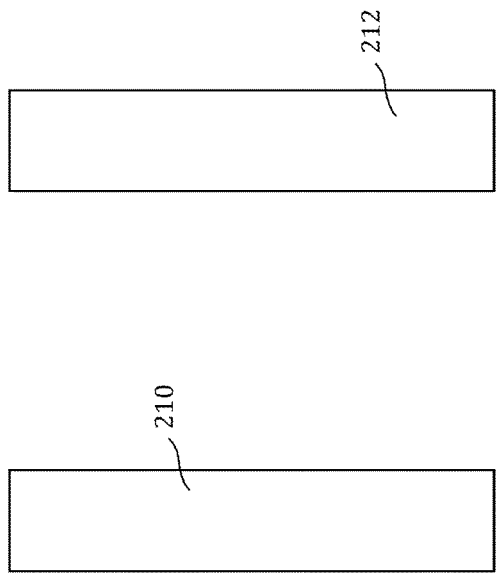
FIG. 5
FIG. 6
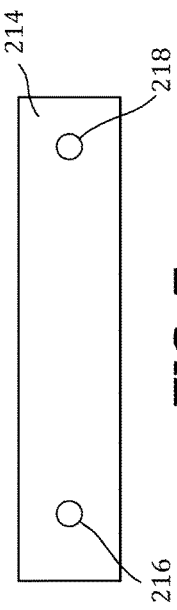
FIG. 7
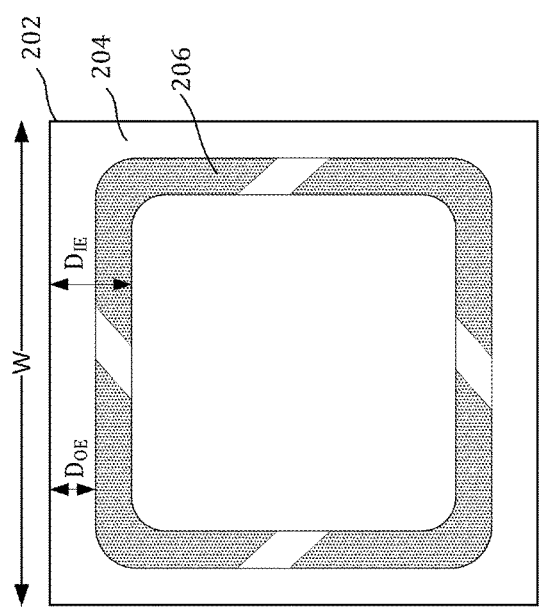
FIG. 2
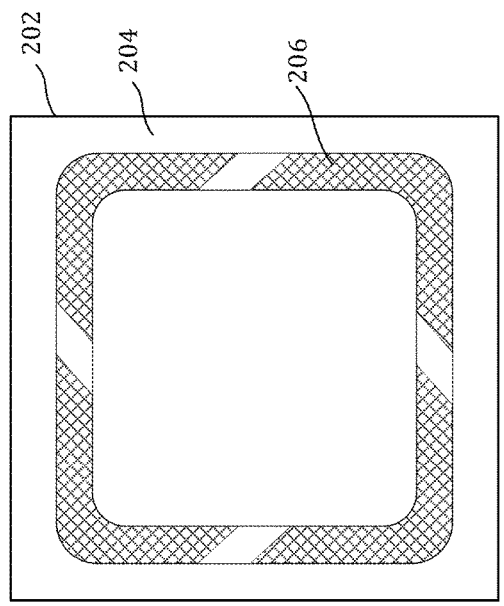
FIG. 3

TOUCHLESS UTILITY CONTROLLER

CROSS-REFERENCE TO RELATED APPLICATIONS

This application claims the benefit of U.S. Provisional Application No. 63/314,150, filed 25 Feb. 2022, and U.S. Provisional Application No. 63/325,363, filed 30 Mar. 2022, which applications are incorporated herein by reference in their entireties. To the extent appropriate, a claim of priority is made to both applications.

BACKGROUND

Utilities such as gas, water, and electricity may need to be turned on or off in many different situations. For instance, in laboratories, restaurants, schools and other environments, providing natural gas to the corresponding equipment during times when the gas is not needed (e.g., outside of business hours) may not be preferable. Water and/or electricity may be similarly be unnecessary during such times.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for controlling utilities through a touchless utility controller.

In an example, the present disclosure describes a system for controlling a utility. In examples, the system comprises an RFID reader; a visual indicator; a processor; and memory, storing list of registered unique identifiers and storing instructions that, when executed the processor, cause the system to perform operations. In examples, the operations include: receiving, by the RFID reader, an RFID signal from an RFID tag, the RFID signal including a unique identifier; comparing the unique identifier to the list of registered unique identifiers to determine that the RFID tag is a registered RFID tag; in response to determining the RFID tag is a registered RFID tag: transmitting an activation signal to a valve control device to cause a valve controlling a utility to open; illuminating the visual indicator to a first color; and initiating a shutdown timer; and upon expiration of the shutdown timer: ceasing the transmission of the activation signal; and illuminating the visual indicator to a second color.

In another example, the present disclosure describes a touchless utility controller. In examples, the touchless utility controller comprises a housing encompassing: circuitry configured to receive a signal, and based on the received signal, provide an activation signal to a valve control device for a valve. In examples, the housing also comprises: a face having an illuminated portion to allow for a visual indictor to illuminate the illuminated portion, wherein the face does not include any physically activated interface elements; and at least one of an outer side perimeter connected to the face or a back side. In examples, at least one of the outer side perimeter or the back side defines at least one through hole for receiving a input power wiring and output transmission wires for connecting to the valve control device for the valve controlling one of gas or water.

In another example, the present disclosure describes a method for controlling a utility, comprising: receiving, by an RFID reader of a utility controller, a first RFID signal from a first RFID tag; and comparing, by a processor of the utility controller, the first RFID signal to a list of registered unique identifiers to determine that the first RFID tag is a registered RFID tag. In response to determining the first RFID tag is a registered RFID tag, the method may further comprise: transmitting an activation signal to a valve control device to cause a valve controlling a utility to open; illuminating a visual indicator to a first color; and initiating a shutdown timer. In examples, the method may further comprise receiving, by the RFID reader, a second RFID signal from a second RFID tag; comparing, by the processor of the utility controller, the second RFID signal to the list of registered unique identifiers to determine that the second RFID tag is a registered RFID tag; and in response to determining the second RFID tag is a registered RFID tag: ceasing the transmission of the activation signal; and illuminating the visual indicator to a second color.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 depicts a front view of a touchless utility controller with a visual indicator in an inactive state.

FIG. 3 depicts a front view of the touchless utility controller with a visual indicator in an active state.

FIG. 4 depicts a top view of the touchless utility controller.

FIG. 5 depicts a left side view of the touchless utility controller.

FIG. 6 depicts a right side view of the touchless utility controller.

FIG. 7 depicts a bottom view of the touchless utility controller.

DETAILED DESCRIPTION

Figure 1A:
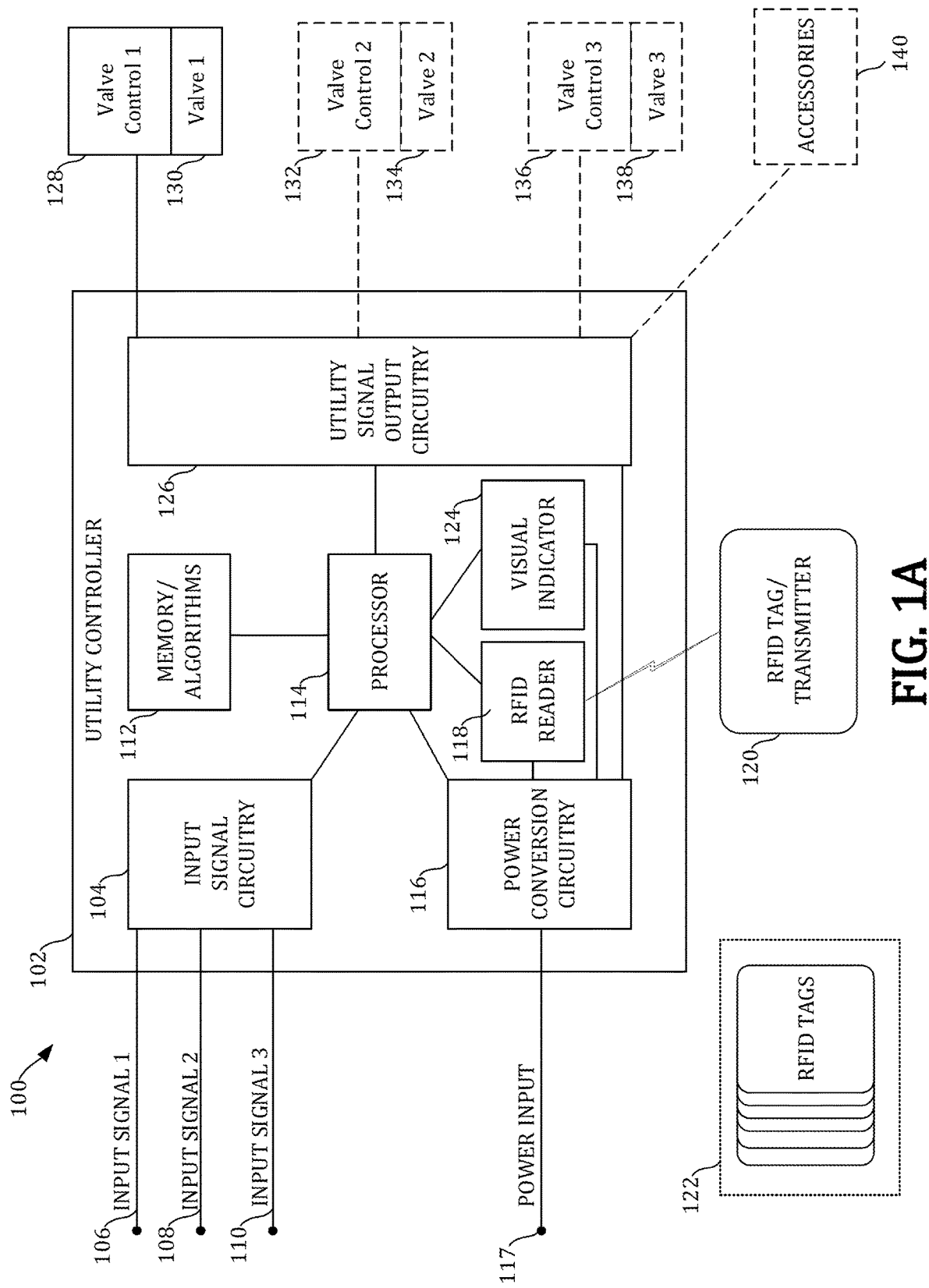
FIG. 1A depicts an example system for controlling at least one utility with a touchless utility controller.

As briefly discussed above, control of one or more utilities, such as gas, water, and electricity, may be beneficial in many different settings. For instance, in a restaurant or kitchen setting, it may be desirable to remove natural gas from the cooking appliances outside of business hours. Similarly, for a laboratory or a classroom, having running water and/or gas delivered to different stations (e.g., sinks, burners, etc.) may not be necessary outside of school or lab hours. In addition, having such utilities remain on and providing the gas and/or water to the appliances and/or stations may increase the risk of potential damage caused by flooding, fires, or other potential disasters.

One option for controlling utilities requires a manual activation of a valve (e.g., manually rotating a valve between an open and closed position) at a main source of the gas or water. While such an option may be simple and reliable, such a manual option is often not possible as the valves are not readily accessible to most operators, such as lab technicians, teachers, chefs, etc. Another option for controlling utilities is to provide a complex system that allows for significant physically selected options (e.g., buttons, touchscreens, dual in-line package (DIP) switches, physical keys) and configurations by an operator to control the activation of utilities remotely. However, such complexity significantly increases costs and manufacturing difficulties. Further, such complexity is only useful where the operator is well-trained on how to operate the device. For example, systems that require physical keys and selections of multiple buttons may potentially cause uncertainty and discomfort for the operator—especially where the control of flammable substances like natural gas is involved. As a result, such complex controllers often go unused and/or the corresponding utilities are not controlled in the intended manner.

The present technology, among other things, may address the above issues by providing an intuitive and reliable utility controller that may utilize no buttons, keys, touchscreens, touch inputs, DIP switches or other physically activated interface elements on the face or front of the utility controller. Instead of using such physically activated interface elements, the present utility controller may implement short-range wireless communication, such as radio frequency identification (RFID), to activate and deactivate the corresponding utilities. For instance, when an operator holds a pre-registered RFID tag near the utility controller, the utility controller either activates or deactivates a utility. As an example, a chef may enter a kitchen to begin a shift and hold the registered RFID tag near the utility controller to activate the natural gas to the kitchen. At the end of the day, the chef may again hold the registered RFID tag near the utility controller to deactivate the natural gas. The utility controller may also include a shutdown timer that is initiated when the utility is activated. Upon expiration of the shutdown timer, the utility controller automatically deactivates the utility. Accordingly, in the example of the chef above, even if the chef forgot to deactivate the natural gas when leaving for the day, the utility controller will automatically deactivate the natural gas upon expiration of the shutdown timer.

Such touchless control of the utility controller also provides for additional mechanical advantages in both physical space savings for the utility controller and the ability to better seal and water/weather proof the utility controller. For instance, by not having any protruding physical switches through the housing, the likelihood of water or other environmental elements from entering the housing is significantly reduced. As a result, the utility controller may also be used in outdoor environments as well as indoor environments. Moreover, without any keys, physical switches, or buttons on the utility controller, the utility controller may be manufactured without any moving parts. With no moving parts or direct manual interaction with the controller by operators, the utility controller is less likely to suffer from wear-and-tear, which further improves the longevity of the utility controller.

The utility controller may also include a visual indicator that clearly indicates the on or off state of the corresponding utility, even from a distance. For example, the face of the utility controller may include a large visual indicator that changes color based on the current state of the utility controller. By changing color rather than simply turning off the visual indicator, confusion is removed as to whether power has been lost, the controller is not functioning, and/or the state of the utility has changed. The combination of the streamlined wireless interface with the clear visual indicator provides for an improved utility controller that is intuitive, reliable, and instills confidence in the operator to correctly use the utility controller.

FIG. 1A depicts an example system 100 for controlling at least one utility with a touchless utility controller 102. The utility controller 102 includes a plurality of components that allows for the selective control of one or more electronic devices or utilities, such as natural gas, water, or electricity.

The utility controller 102 may include input signal circuitry 104 for receiving input signals into the utility controller 102. The input signal circuitry 104 may include physical components and well as signal conditioning and/or modifying components that modify the incoming input signals to a format that may be processed or used by the utility controller 102.

The input signals may include a variety of signals, such as a first input signal 106, a second input signal 108, and a third input signal 110. The input signals may include a panic button activation signal, which may be a signal generated from the manual activation of a panic button (not shown). The panic button may be located at a position remote from the utility controller 102, such as on another side of a room or building. The input signals may also or alternatively include a building management system signal that may indicate hours of operation of the building or other similar signal that may be used by the utility controller 102 to activate or deactivate one or more of the utilities based on the building policies or controls. The input signals may also or alternatively include an emergency service signal that may be generated from activation of a fire alarm, carbon monoxide monitor, or other similar devices.

The utility controller 102 also includes a processor 114 that processes data and controls the operation of the utility controller 102. For instance, the processor 114 receives the input signals from the input signal circuitry 104 and processes those signals to determine actions and outputs of the input signal circuitry 104. The processor 114 also receives signals from other sources, as depicted in FIG. 1A and discussed further below.

A memory 112 is also included in the utility controller 102. The memory 112 may be a non-transitory, physical storage medium. The memory 112 stores instructions corresponding to algorithms that, when executed by the processor 114, cause the utility controller 102 to perform the operations discussed herein among other potential operations. For instance, the memory 112 may store instructions that, when executed by the processor 114, cause the utility controller 102 to perform the operations of the methods 1300 and 1400 discussed below with reference to FIGS. 13-14. In some examples, the memory 112 and the processor 114 may be packaged in the same chip or component, such as in a microcontroller or other similar device.

The utility controller 102 may also include utility signal output circuitry 126. The output circuitry 126 may include physical components for mechanical connection of wiring between the processor 114 and outputs to valves and/or other accessories 140. The output circuitry 126 may also include signal modifying and/or conditioning components that modify a received signal. When the output circuitry 126 receives an activation signal for a particular utility, the output circuitry 126 generates a new signal, modifies the activations signal, and/or passes the activation signal to one or more valves corresponding to the utility to be activated. The output signals from the output circuitry 126 may be high voltage (e.g., 60 volts or higher) or low voltage (e.g., 24 volts or less) depending on the type of valve control device that is used to control the various valves.

In some examples, the utility controller 102 may control a single valve of the system 100, such as a first valve 130. The first valve 130 may be a valve that controls the flow of gas or water. The position of the first valve 130 is controlled by a first valve control device 128, which may be a solenoid, a motor to rotate a ball valve, or other type of valve actuator. When the first valve control device 128 receives the activation signal from the output circuitry 126, the first valve control device 128 causes the first valve 130 to open, which results in the corresponding fluid (e.g., water or gas) to flow through the first valve 130. When the activation signal ceases, the first valve control device 128 causes the first valve 130 to close, which prevents the flow of the corresponding fluid.

In the example of a solenoid, the solenoid may be a normally closed solenoid that is held open while the activation signal is present. Thus, when the activation signal ceases or is removed, the solenoid returns to its normally closed state. In the example of a motor to control a ball valve, the activation signal may cause the motor to rotate the ball of the ball valve to an open position. While the activation signal is present, the power from the signal charges a capacitor in the first valve control device 128. When the activation signal ceases or is removed, the capacitor discharges and causes the motor to rotate the ball of the ball valve to a closed position. In examples, the output circuitry 126 may be configured to output the activation signal only on demand (thus resulting in the first valve 130 being normally closed and the utility being normally off). In other examples, the output circuitry 126 may be configured to cause the activation signal to be normally present (e.g., on startup of controller 102), and the solenoid may cause the first valve 130 to be held open (and the utility on) unless and until the activation signal is removed in response to receiving a signal to turn the utility off (e.g., from the RFID reader 118 reading a tag 120, receiving an emergency system input, receiving input from a panic button, etc.).

In other examples, the first valve 130 may be biased to be normally open, and an activation signal from circuitry 126 causes the first valve 130 to close. In the solenoid example, the solenoid may be a normally open solenoid that is only held closed while the activation signal is present. Thus, when the activation signal ceases or is removed, the solenoid returns to its normally open state. In the example of a motor to control a ball valve, the activation signal may cause the motor to rotate the ball of the ball valve to a closed position. While the activation signal is present, the power from the signal charges a capacitor in the first valve control device 128. When the activation signal ceases or is removed, the capacitor discharges and causes the motor to rotate the ball of the ball valve to an open position.

Additional valves and valve control devices may also be included in the system 100 and controlled by the utility controller 102. For instance, a second valve control device 132 and a second valve 134 may be included. A third valve control device 136 and a third valve 138 may also be included. The second valve control device 132, second valve 134, third valve control device 136, and the third valve 138 may be the same or different types of devices or valves as the first valve control device 128 and the first valve 130.

The additional valves may be for controlling the same utility or a different utility. In an example, the first valve 130, second valve 134, and the third valve 138 may all control natural gas. For instance, each valve may control natural gas to a different station in a laboratory or to a different major appliance in a kitchen. Accordingly, a common activation signal may be sent to all three of the valves. Alternatively, the valves may be individually controlled with different activation signals sent and controlled for each of the valves.

In other examples, the different valves may control different utilities. For example, the first valve 130 may control the flow of gas and the second valve 134 may control the flow of water. In such an example, different activation signals may be generated for control of the first valve 130 and control of the second valve 134.

One or more accessories 140, such as a fan or other electronic accessories, may also be controlled by the utility controller 102. In some examples, a fan of a vent hood may be desired to be activated in all cases where the natural gas is activated. In such examples and where the first valve 130 controls the flow of natural gas, activation signals may be concurrently sent to the first valve control device 128 and the fan 140 when a natural gas utility is selectively activated by an operator. The electronic accessories 140 may be controlled by providing and removing power from the accessories 140. In other examples, an activation signal may be sent to an electrically controlled device, such as a relay or a switch, that causes the accessory 140 to turn on or off and/or allow electrical power to be provided to the accessory 140. In such examples, the electrically controlled device for controlling the accessory 140 provides a similar function as the valve control devices discussed above. Accordingly, in some examples, the valve control devices may also be considered electrically controlled devices.

The utility controller 102 also includes an RFID reader 118. The RFID reader 118 may include an antenna and a transceiver. The RFID reader 118 may generate an RFID-activate signal that is transmitted wirelessly and activates an RFID transponder of an RFID tag 120 of a plurality of RFID tags 122. The transponder of RFID tag 120 then returns an RFID signal with RFID data of the RFID tag 120, which may include a unique identifier for the RFID tag 120. The data received by the RFID reader 118 from the RFID tag 120 may then be processed by the processor 114 to determine actions to be taken by the utility controller 102.

In examples where the RFID data in the received RFID signal includes a unique identifier for the RFID tag 120, the unique identifier may be compared to set of registered identifiers stored in the memory 112. The registered identifiers may correspond to RFID tags that have been previously authorized to activate or deactivate a particular utility. In some examples, some RFID tags in the set 122 may be registered to control a first utility or valve and other RFID tags in the set 122 may be registered to control a second utility or valve. The registered identifiers may be loaded into the memory 112 when the utility controller 102 is manufactured, shipped, and/or installed. For instance, the utility controller 102 may be delivered with the set of RFID tags 122 that include RFID tags with the registered unique identifiers. Accordingly, those registered RFID tags may be given to the operators of the utility controller 102, and access to the control of the corresponding utility may be controlled by limited those persons that receive a registered RFID tag. In some examples, additional RFID tags may be added to list the registered RFID tags through the use of a master RFID tags or other techniques discussed herein.

When the RFID reader 118 reads a registered RFID tag 120, the processor 114 causes an activation signal to be generated and transmitted to one or more of the valve control devices 128, 132, 136 to activate a corresponding utility by opening one of the corresponding valves 128, 132, 136. As an example, when a registered RFID tag 120 is detected, the utility controller 102 sends an activation signal to the first valve control device 128 that causes the first valve 130 to open. While the first valve 130 is open, the corresponding utility is in an active or "on" state. The processor 114 may also initiate a shutdown timer having a set duration. The set duration may be based on the particular RFID tag 120 that is detected or a setting of the utility controller 102.

The valve remains open and the utility remains in the active state until one or more deactivation conditions occur. The deactivation conditions may include receiving a subsequent detection of the registered RFID tag 120 (or another registered RFID tag), expiration of a shutdown timer, receiving a signal from an emergency services input signal, receiving a signal from a building management services input signal, and/or receiving a signal from a panic button input signal. In examples, when a deactivation condition occurs, the generation and/or transmission of the activation signal to the first valve control device 128 is ceased, which causes the first valve 130 to close and the corresponding utility to enter an inactive or "off" state. In examples, the first valve 130 may be closed due to an emergency situation (e.g., receiving an emergency shutdown signal in the form of, e.g., an emergency services input signal, a signal from a panic button, etc.). In some examples, the utility controller 102 will not allow the valve 130 to be reopened until an emergency override signal is received from an authorized operator. For example, the utility controller 102 may receive an emergency override signal in the form of a second emergency services input signal, or the RFID reader 118 may receive an emergency override signal in the form of reading an RFID tag 120 registered to an authorized user having elevated privileges, or an RFID tag 120 that is specifically designated as an emergency override tag, etc.

Beyond activation and deactivation of the utility, the utility controller 102 also uses the set of RFID tags 122 to modify settings of the utility controller 102. For example, a master RFID tag may be provided in the set of RFID tags 122. The master RFID tag transmits a unique identifier that corresponds to a master functionality in the list of registered identifiers in the memory 112. When the master RFID tag is scanned (e.g., the RFID reader 118 reads/detects the master RFID tag), the utility controller 102 then enters a configuration mode and waits for an additional RFID tag to be scanned. For example, an unregistered RFID tag or a configuration RFID tag may be scanned while the utility controller 102 is in the configuration mode.

When an unregistered RFID tag is scanned during the configuration mode, that unregistered RFID tag is added as a registered RFID tag. For instance, the identifier corresponding to the unregistered RFID tag may be added to the list of registered identifiers.

When the configuration RFID tag is scanned during the configuration mode, one or more settings of the utility controller 102 may be changed. The configuration RFID tag, which may be in the set of RFID tags 122, may have another unique identifier and/or store configuration data that is transmitted to the RFID reader in the configuration RFID signal. For example, the processor 114 may identify the configuration RFID tag, and based on the identification of the configuration RFID tag, perform a local lookup to determine a corresponding settings change that should be made. In other examples, the configuration RFID signal may include data directly indicating the settings change that should be made. For example, the settings change may be a change to a shutdown timer duration, and the configuration data may indicate a particular duration for the shutdown timer.

Some changes to the configuration or settings of the utility controller 102 may also be achieved though the master RFID card alone based on the duration that the master RFID card is scanned. For example, if the master RFID card is scanned (e.g., held near the utility controller 102) for a duration exceeding a reset threshold (e.g., 30 seconds, 1 minute), the utility controller may perform a factory reset of the utility controller 102. The factory reset may also clear from memory 112 the registered identifiers for RFID cards (other than the master RFID cards or some subset of RFID cards).

In examples, as used herein, RFID refers to short-range radio frequency communication. In examples, short-range radio frequency communication refers to radio communication with less than one foot, less than three feet, less than ten feet, or less than twenty feet of effective range between an RFID tag or emitter and an RFID reader. In examples, as used herein, RFID also encompasses near-field communications (NFC) protocols, or other similar protocols for short-range radio frequency communication. The RFID tag 120 may be in the form of a card, a fob, or other type of physical housing for the RFID tag 120. In some examples, the RFID tag 120 may also be digital tag, such as provided by a mobile device (e.g., smartphone). For instance, the mobile device may be configured to provide the RFID data to the RFID reader 118 when the mobile device is brought into proximity with the utility controller 102 (which may be triggered by an RFID-activate signal from the RFID reader). While the RFID tag 120 is generally described herein as being a passive RFID tag, in other examples the RFID tag 120 may be an active RFID tag.

The utility controller 102 also includes a visual indicator 124, which may include one or more light-emitting diodes (LEDs) or other similar illumination sources. The visual indicator 124 is viewable from outside a housing of the utility controller 102, and the visual indicator 124 may indicate various states of the utility controller or the corresponding utilities. For example, when a utility is in the active state (e.g., the corresponding valve is open), the visual indicator 124 may be illuminated with a first color, such as green, to indicate the utility is in the active state. When the utility is in the inactive state (e.g., the corresponding valve is closed), the visual indicator 124 may be illuminated with a second color, such as red, to indicate the utility is in the inactive state. In other examples, the color corresponding to the active state may be based on the type of utility that is being controlled. For instance, the active state of a water utility may be indicated by a blue color, and the active state of a natural gas utility may be indicated by a yellow color. By having the visual indicator 124 illuminated in both the inactive and active states of the utility, rather than simply turning off in during the inactive state, the operator is able to determine that utility controller 102 is still operational and receiving power.

In some examples, the visual indicator 124 may pulse or fade in and out while illuminated to provide additional visual effects through a sequence of changes to the output of the visual indicator 124. When the utility controller 102 is in an emergency state or a panic state based on receiving an emergency or panic input signal, the visual indicator 124 may continuously flash the second color (e.g., red) or another color to indicate the emergency or panic situation.

The visual indicator 124 may also provide output responses from the utility controller 102 based on events. For example, if an RFID tag is detected that is unregistered, the visual indicator 124 may provide a rejection sequence, which may be a series of flashes or color sequences. As another example, when a master RFID tag is detected, the visual indicator 124 may be illuminated with a color, other than the color used for the active state and inactive state, to indicate that the utility controller 120 is in a configuration state. The indication of the configuration state may also be presented through a configuration illumination sequence (e.g., particular flashes or changes in light) that indicates the utility controller 102 is in the configuration state. A confirmation sequence may also be illuminated when a configuration RFID card is detected and the utility controller 102 setting(s) are changed. A different or similar confirmation sequence may also be illuminated when an unregistered RFID card is added as a registered card during the configuration state.

In addition or alternatively to the visual indicator 124, the utility controller 124 may also include an audio output component (not depicted), such as a speaker, that can be controlled to emit sounds from the utility controller 124. For instance, a first sound may be emitted when a utility is activated and a second sound may be emitted when a utility is deactivated. Similar to the visual sequences discussed above, additional or other sound sequences may also be emitted to convey additional response information, such as an unregistered card, entering a configuration mode, etc. The audio output may also sound alarms during an emergency situation. Sounds indicating startup of the utility controller may also be emitted.

The utility controller 102 also includes power conversion circuitry 116 that converts or modifies an input power 117 to the utility controller 102. For example, the input power 117 may be 120 VAC and the power conversion circuitry 116 may convert that power to other voltages and/or currents that are suitable for the components of the utility controller 102 and/or for providing the activation signals from the output circuitry 126. The power conversion circuitry 116 may include a transformer, which may be a step-down transformer to reduce the voltage from that of the input power 117. The power conversion circuitry 116 may also include AC-DC converters, DC-DC converters, voltage dividers, or the like to convert the input power 117 to power suitable for use by the components of the utility controller 102 and/or to activate the one or more valve control devices.

While FIG. 1A depicts the components of the utility controller 102 being housed within a single housing, in other examples, some components may be modularly located or positioned. As an example, the RFID reader 118 may be housed or positioned separately from the visual indicator 124. For instance, the RFID reader 118 may be provided in a first housing that is located at an easily accessible position in the room, such as near a door or a desk, and at a height that is reachable by a user. The visual indicator 124 may be provided in a separate, or second, housing that is located away from the first housing. For instance, the visual indicator 124 may be positioned higher on a wall such that the visual indicator 124 may be seen more easily by those within the room. The remaining components of the utility controller 102 may be housed in the first housing and/or the second housing. In other examples, a second visual indicator may be provided separately from the utility controller 102, and that second visual indicator may be positioned in a manner that can be easily seen from those in the room. In the foregoing examples, wiring between the separate housings may be provided such that signals can be communicated between the components within the housings. In other examples, the communication may be achieved wirelessly.

Figure 1B:
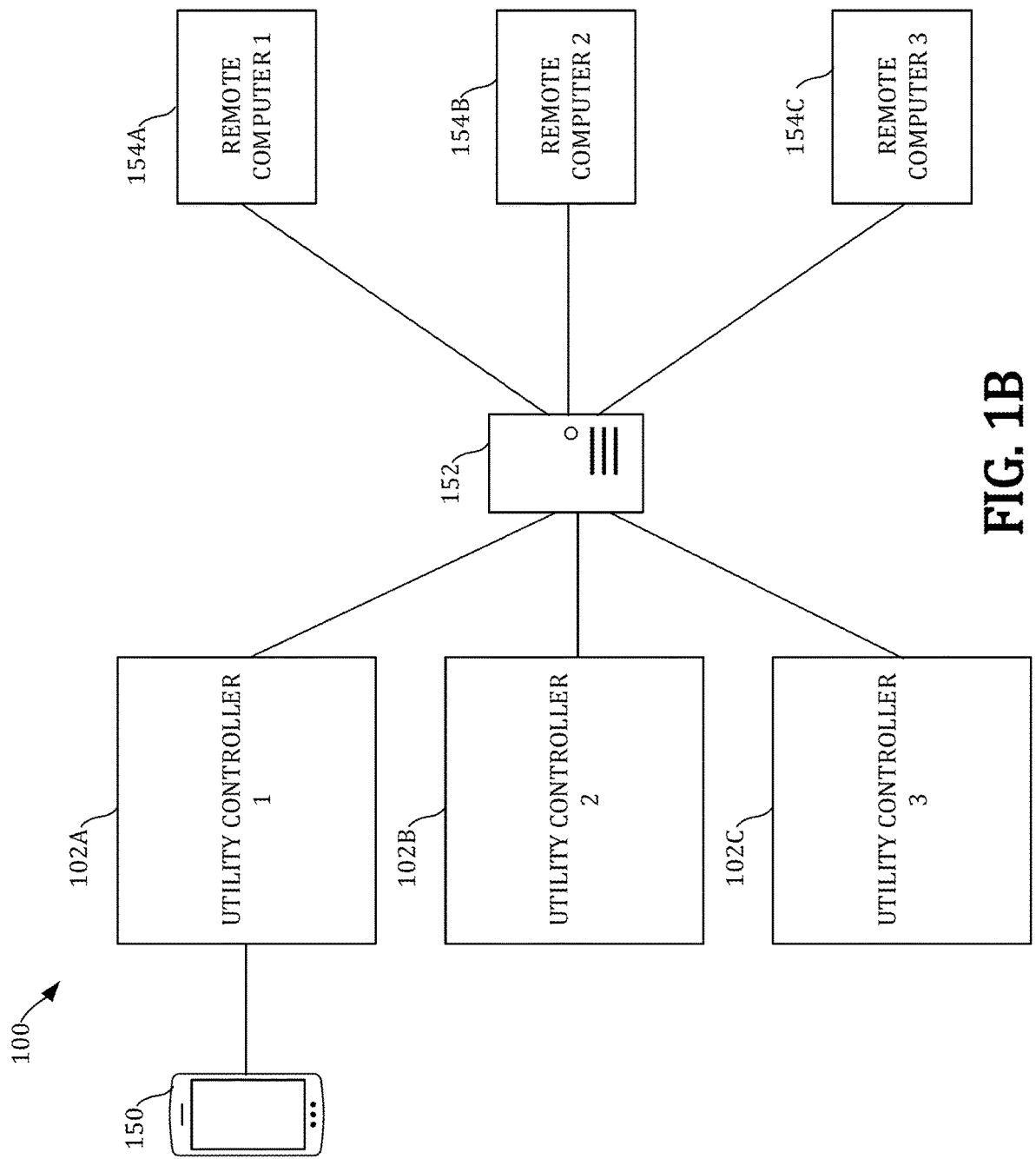
FIG. 1B depicts additional components of an example system for interacting with a touchless utility controller using one or more mobile device, server, and/or remote computing device.

FIG. 1B depicts additional components of the example system 100 for controlling at least one utility with a touchless utility controller 102. In some examples, the utility controller 102 may have additional communication circuitry to allow for longer range wireless communication, such as via wireless internet (e.g., WIFI) or other short-range communication protocols (e.g., BLUETOOTH). In such examples, the utility controller 102 may communicate with a mobile device 150 through either a short-range connection or an Internet-based connection. The mobile device 150 may have an application that allows data to be exchanged between the mobile device 150 and the utility controller 102. For example, activation and deactivation of a utility may be initiated through user input into the application on the mobile device 150. In addition, a duration of the shutdown timer may be displayed within an interface of the application on the mobile device 150. Further, settings of the utility controller 102, such as the duration of the shutdown timer, may be changed based on user input in the application on the mobile device 150. While depicted as a smartphone in FIG. 1B, the mobile device 150 may a tablet, laptop, or other type of computing device capable of establishing the corresponding wireless connection to the utility controller 102.

The utility controller 102 may also be communicatively connected to a server 152 via the Internet or local-area network (LAN). In some examples, multiple utility controllers 102A-C may be connected to the server 152. The server 152 may receive data corresponding to the current states of the utility controllers 102A-C and/or the corresponding states of the controlled utilities (e.g., whether a utility is in an active or inactive state). The state data may be transmitted from each of the utility controllers 102A-C to the server 152 at a regular interval or in response to a request or query generated from the server 152.

The server 152 may also store an event log from each of the utility controllers 120A-C. For instance, each utility controller 102A-C may separately store a log of events that occur at the utility controller, such as when utilities are activated/deactivated and the unique identifiers of the RFID tags that were used to trigger such activation/deactivation. Accordingly, from the event log, a determination of which RFID tags (and their corresponding operators) activated or deactivated a utility may be made. This event log may be transmitted to the server 152 for queries or investigation. By offloading the log data to the server 152, each of the utility controllers may need to retain less data and can have less local memory/storage.

The server 152 may be accessible by one or more remote computers 154A-C. The remote computers 154A-C may access the server 152 through a web-based portal (e.g., a website/webpage) and/or a dedicated local application running the respective remote computer 154. By accessing the server 152, a remote computer is able to obtain information about the current states of one or more of the utility controllers 102A-C and/or the event log data for one or more the utility controllers 102A-C. Such information may also be used to determine a duration for which a utility has been or was in an active state.

In some examples, the duration information may be used to assess charges for the use of the utility. For example, the utility controller 102 may control a gas valve that controls the flow of gas to a firepit in a common area of a residential community. Residents of the residential community may each be issued a registered RFID tag with a unique identifier. Accordingly, based on the RFID tag used to activate the valve and the firepit, a determination may be made as to which resident performed the activation. The duration of the activation may then be used to bill that resident for the corresponding use and duration of the firepit and gas.

The list of registered unique identifiers, stored on the utility controller 102, for the RFID tags may also be managed via the mobile device and/or the remote computers via the server 152. For instance, an operator may add or remove unique identifiers to or from the list. As another example, the server 152 may regularly push or update the list of the registered unique identifiers to the utility controller 102. In other examples, the list of registered unique identifiers may be stored on the server 152 and/or a remote computer 154. In such examples, when an RFID tag is scanned by the utility controller 102, the utility controller 102 sends the corresponding unique identifier to the server 152, where the server 152 performs the comparison to the list of registered unique identifiers, and then the server 152 sends an approve or reject indication back to the utility controller 102. Upon receiving an approve indication, the utility controller 102 generates the activation signal to activate the utility (or ceases the activation signal to deactivate the utility).

By utilizing a server 152 or computing device 154 to help maintain or update the list of registered unique identifiers, the list may be changed more easily and multiple unique identifiers may be added or removed more quickly. For example, where the utility controller 102 is placed within a residential community and control of the corresponding utility by the residents is desired, the list of unique identifiers for RFID tags already distributed to residents (such as for opening doors). Other types of businesses or locations (e.g., schools, restaurants, laboratories offices) may also implement similar synchronizations between RFID tags used for other access-control purposes and the utility controller 102. In such examples, the role of the person to which the corresponding RFID tags may also be taken into account and updates to the list of registered unique identifiers may be similarly implemented. For example, if a resident moves out of a residential complex or an employee leaves a company, the unique identifiers corresponding to the RFID tags issued to that person may be removed from the list of registered unique identifiers. As another example, if a teacher changes roles and is no longer working in laboratory (e.g., changes from science teacher to history teacher), the unique identifier for that teacher's RFID tag may be removed from the list of registered unique identifiers. Such removals (and/or additions) may be performed automatically. For instance, when a new RFID tag is issued to a person having a specific role, the list of registered unique identifiers may automatically be updated to add the unique identifier of the new RFID tag. Similarly, when a person is removed from a role, the list of registered unique identifiers may be automatically be updated to remove of a unique identifier of the RFID tag issued to that person.

FIG. 2 depicts a front view of a touchless utility controller 202 with a visual indicator 206 in an inactive (or "off") state. As discussed above, the utility controller 202 is streamlined to provide a touchless form that still functions and clearly conveys state information to the operator. To achieve those benefits, a front face 204 of the utility controller 202 does not include any physically activated interface elements such as elements that are activated by physical touch (e.g., capacitive or resistive touch sensors) or physical interaction from an operator (e.g., buttons, switches, key receptacles. The term "touchless," however, does not preclude a user from touching the RFID tag against a surface of the controller 202 while bringing the RFID tag near the utility controller. Rather, the front face 204 includes a large visual indicator 206 that indicates the state of the utility controller 202 and/or the controlled utility, and an RFID reader behind the surface of the front face 204 allows for selective activation/deactivation of the utilities. The visual indicator 206 may be formed in part by a translucent portion in the front face 204 that allows for an illumination source of the visual indicator 206 to transmit light through, or illuminate, the translucent portion. Of note, while the term translucent is used herein, the translucent portion may also be transparent. The portion of the front face 204 that is illuminated by the illumination source of the visual indicator may be referred to as the illuminated portion.

The illuminated portion may occupy a substantial portion of the surface area of the front face 204. For example, the surface area of the illuminated portion may occupy at least 10%, 20%, or 30% of the surface area of the front face 204. By having the illuminated portion occupy a larger surface area, the ability to see the visual indicator 206 from a further distance is increased, which allows an operator to see the visual indicator 206 and determine the corresponding state of the utility from across the room.

The illuminated portion may also be near the perimeter of the front face 204 to allow for the RFID reader to be placed more toward the center of the utility controller 202 without interference from other electronics, such as the visual indicator 206. For instance, the front face 204 may have a width W (or diameter in the case of a circularly shaped front face 204). The outer edges, or perimeter, of the illuminated portion may be within 10%, 20%, or 30% of the width W (or diameter) from all exterior edges of the front face 204. For instance, a distance (DoE) from the exterior edge of the front face 204 to the outer edge of the illuminated portion may be less than 10%, 20%, or 30% of the width W (or diameter). In some examples, the inner edges, or perimeter, of the illuminated portion may be within 20%, 30%, 40%, or 50% of the width (or diameter) from all exterior edges of the front face 204. For instance, a distance (DIE) from the exterior edge of the front face to the inner edge of the illuminated portion may be less than 20%, 30%, 40%, or 50% of the width W (or diameter). The distances DoE and DIE may the shortest distance between the two respective points and/or may be measured in a direction orthogonal from an exterior edge of the front face 204. With such a configuration, the RFID reader may be placed near the center of the front face 204 and inside (e.g., more towards the center) of the inner boundary of the illuminated portion formed by the inner edge of the continuous illuminated portion. In some examples, the shape of the illuminated portion is substantially the same as the outer boundary of the front face 204. For instance, in the example depicted in FIG. 2, the illuminated portion forms a rectangle as does the outer boundary of the front face 204.

While the front face 204 in this example is depicted as planar and rectangular, the front face 204 may be formed in other shapes. For instance, as mentioned above, the front face 204 may have a circular or oval perimeter. The front face 204 may also bulge outward or protrude inward to form a saucer shape, a dome shape, or a disk shape, among other types of shapes. Accordingly, the term "face" is not intended to limit the physical structure to a particular shape. In addition, while the visual indicator 206 is shown as being on the front face 204, the visual indicator 206 may be provided on other positions of the utility controller 202. In an example, the visual indicator 206 may project light outwards from the utility controller 202, such as from a perimeter or back of the controller, to illuminate a portion of the wall to which the controller 202 is mounted or some other external object.

The visual indicator 206 may illuminate to convey different states or events of the utility controller 202 and/or controlled utility, as discussed herein. In FIG. 2, the visual indicator 206 is illuminated in a first color (e.g., red) to indicate that a utility being controlled is in an inactive (or "off") state. FIG. 3 depicts a front view of the touchless utility controller 202 with the visual indicator 206 in an active (or "on") state. For instance, the visual indicator 206 is illuminated with a second color (e.g., green) to indicate that the utility being controlled is in an active state.

FIG. 4 depicts a top view of the utility controller 202 showing a top surface 208 of the utility controller 202. FIG. 5 depicts a left side view of the utility controller showing a left surface 210 of the utility controller 202. FIG. 6 depicts a right side view of the utility controller 202 showing a right surface 212 of the utility controller. FIG. 7 depicts a bottom view of the utility controller 202 showing a bottom surface 214 of the utility controller 202. The front face 204, top surface 208, left surface 210, right surface 212, the bottom surface 214, and a back surface (not shown) form a housing that may house or encompass the components of the utility controller shown in FIG. 1A and discussed above. For instance, the components of the utility controller 202 may be mounted to a circuit board that is mounted inside the housing. The housing of the utility controller 202 may be in the form of a square or rectangular box, as depicted in FIGS. 2-7. In other examples, the front face 204 may be round and the sides of the housing are formed by a hoop or cylindrical surface. Other shapes are also contemplated, including rounded, saucer-shaped, dome-shaped, disk-shaped, or other types of shapes that can house the components discussed herein. The top surface 208, the left surface 210, the right surface 212, and the bottom surface 214 may collectively form or be referred to as an outer side perimeter of the housing.

As can be seen in FIGS. 4-7, the outer side perimeter of the housing of the utility controller 202 also may not include any buttons, key receptacles, or other physically activated interface elements. The back surface may also not include any such elements.

The bottom surface 214 may include one or more through holes to allow for wiring, such as input power wiring and output transmission wires, to go into and/or out of the housing. In the example depicted, the bottom surface 214 may form a first through hole 216 may be for the power input transmission wires (e.g., power cord) and a second through hole 218 for the output transmission wires (e.g., wires from the output circuitry to the valve control devices). In other examples, a single through hole may be used for both types of wires to reduce the number of through holes in the housing. While the through holes are depicted as being in the bottom surface 214, in other examples, the through hole(s) may be formed in any portion of the outer side perimeter or on the back surface of the housing of the utility controller 202.

Figure 9:
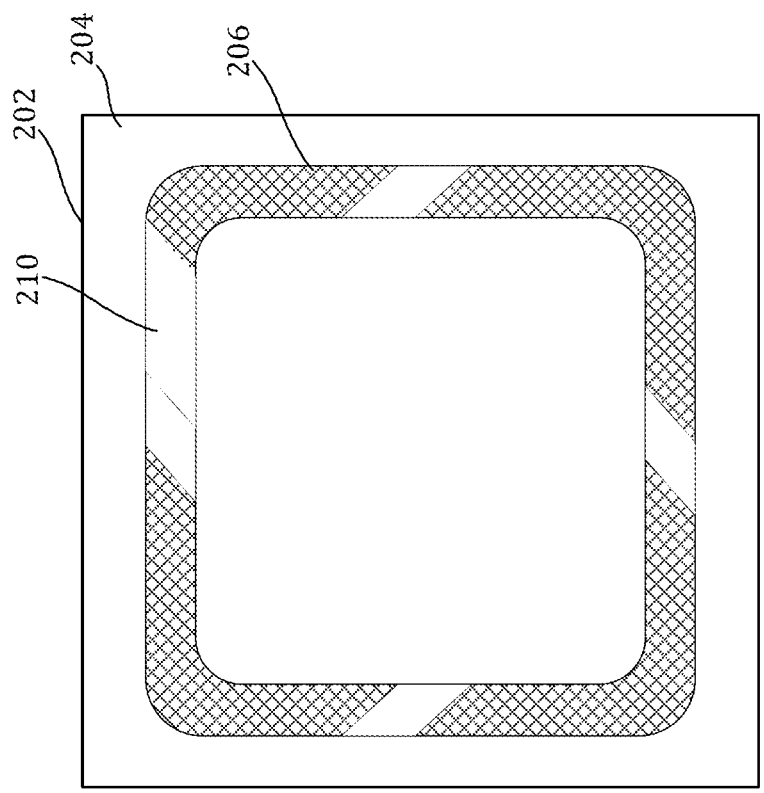
FIG. 9 depicts a front view of the touchless utility controller with the visual indicator that changes with the shutdown timer after a partial duration of the shutdown timer has passed.
Figure 8:
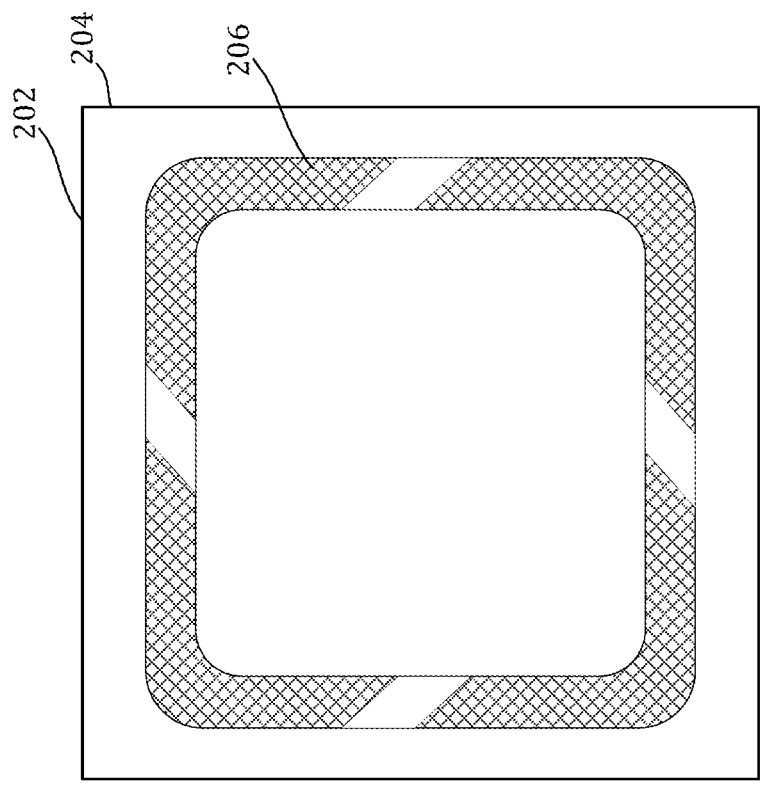
FIG. 8 depicts a front view of the touchless utility controller with a visual indicator that changes with a shutdown timer.

FIG. 8 depicts a front view of the touchless utility controller 202 with a visual indicator 206 that changes with a shutdown timer. As discussed herein, when the utility is activated from a detection of a registered RFID tag, a shutdown timer may be initiated. As the shutdown timer decrease as time passes, it is useful to convey this information to the operator so that the operator is aware how much time is left on the shutdown timer. FIG. 8 shows the visual indicator 206 in the active state (e.g., illuminated with green) when the shutdown timer is first started and no time has passed. FIG. 9 depicts a front view of the utility controller 202 and the visual indicator 206 after a partial duration of the shutdown timer has passed. As can be seen in FIG. 9, a segment 210 of the visual indicator 206 (e.g., the illuminated portion) is no longer illuminated. The length or size of the non-illuminated segment 210 may correspond to the amount of time that has passed since the shutdown timer was initiated.

If the operator sees that the shutdown timer is about to expire and desires more time, in some examples, the operator may be able to rescan to the registered RFID tag to reset the shutdown timer to its full duration. For instance, after a partial duration of the shutdown timer has passed, the utility controller 202 may subsequently detect a double scan of the registered RFID tag to reset the shutdown timer to its full duration. The double scan may be a detection of the same registered RFID card within a time threshold (e.g., 1-5 seconds). When the double scan is detected, the shutdown timer may be reset instead of deactivating the utility and then reactivating the utility. Other types of reactivation scan sequences of the RFID tag may be possible as well to reset the shutdown timer to its full duration.

Figure 11:
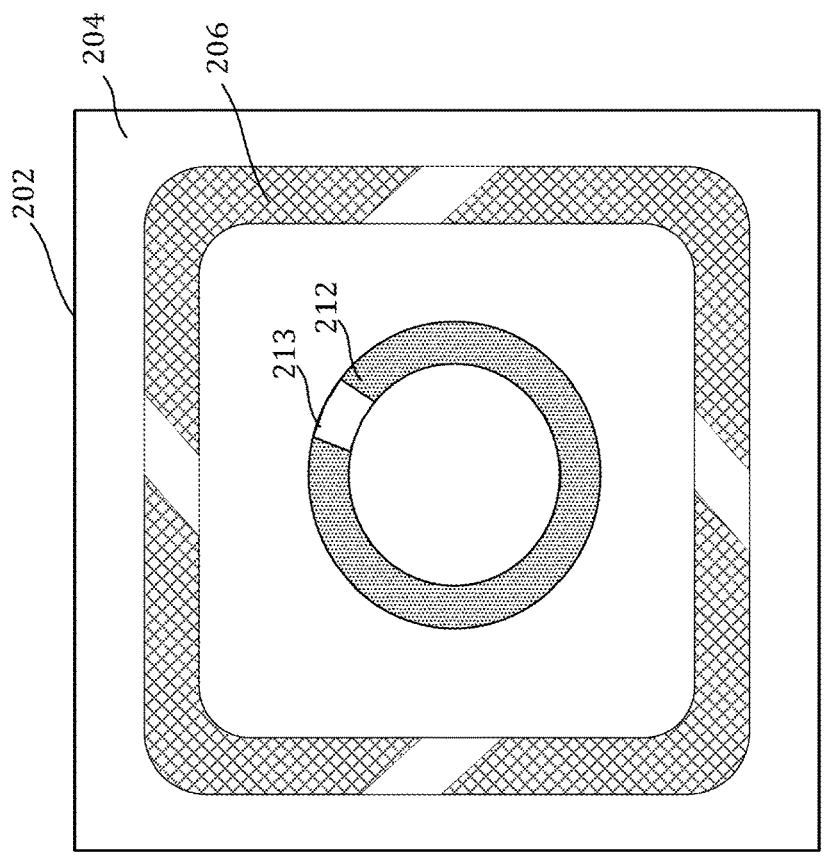
FIG. 11 depicts a front view of the touchless utility controller with the visual indicator and the shutdown timer indicator after a duration of the shutdown timer has passed.
Figure 10:
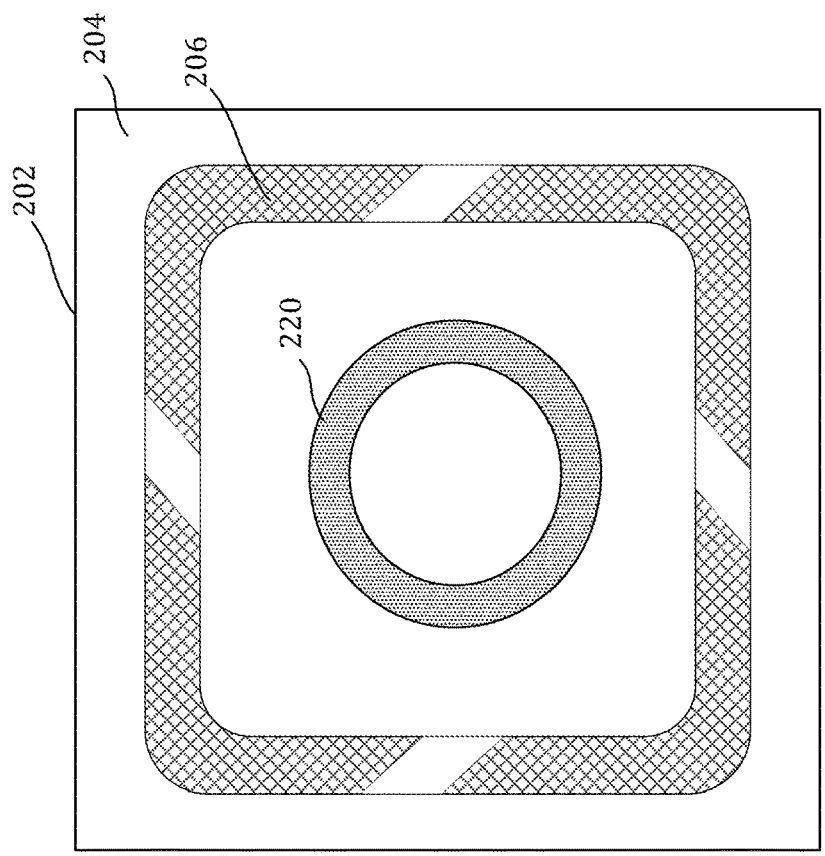
FIG. 10 depicts a front view of the touchless utility controller with a visual indicator and a shutdown timer indicator.

FIGS. 10-11 depict front views of the touchless utility controller 202 with a visual indicator 206 and a shutdown timer indicator 220 on the front face 204. In some examples, the visual indicator 206 that indicates the state of the utility may not indicate or convey information about the time remaining on the shutdown timer. Instead, a separate shutdown timer indicator 220 may be incorporated on the front face 204 of the utility controller 202 to indicate the amount of time remaining on the shutdown timer. In the example depicted in FIGS. 10-11, the shutdown timer indicator 220 is an illuminated ring that may be formed or manufactured similarly to the visual indicator 206. FIG. 10 shows the shutdown timer indicator 220 when the shutdown timer is first started and no time has passed. FIG. 11 shows the shutdown timer indicator 212 after a partial duration of the shutdown timer has passed. As can be seen in FIG. 11, a segment 213 of the shutdown timer indicator 212 is no longer illuminated. The length or size of the non-illuminated segment 213 corresponds to the amount of time that has passed since the shutdown timer was initiated.

In other examples, the shutdown timer indicator 220 may have different forms or have a different geometric shape where the illuminated portion of the geometric shape changes (e.g., reduces) as time passes and the time remaining on the shutdown timer decreases. In yet other examples, the shutdown timer indicator 220 may be a numerical indicator (e.g., seven-segment display or the like) that indicates an amount of time remaining on the shutdown timer in a numerical format.

For example, the shutdown timer indicator 220 may display a numerical indicator (e.g., seven-segment display) to display the amount of time that the shutdown timer was set for upon detection of a registered RFID tag. For example, if a "four hour" registered RFID tag is detected, the shutdown timer indicator may initially display "4:00" and continue to display the numerical indicator of the time remaining as it counts down for an initial display period (e.g., five seconds), after which, in examples, the numerical indicator may no longer be displayed. In other examples, the numerical indicator may continue to be displayed for as long as there is time left on the countdown timer. In some examples where the numerical indicator disappears after the initial period, the numerical indicator may reappear at certain points during a countdown. For example, the shutdown timer indicator 220 may display the numerical indicator of the remaining time when the countdown reaches certain preset limits (e.g., one hour left, ten minutes left, one minute left, etc.). Again, the numerical display of the remaining time may remain displayed for a preset period before disappearing. In other examples, the numerical display may remain displayed until the countdown reaches zero (e.g., it may reappear with one minute (or some other time period) left and remain until the countdown timer reaches zero) or until a registered RFID tag is detected to reset the time period. In some examples, the numerical indicator is displayed simultaneously with a graphical shutdown timer indicator, such as the illuminated ring shown in FIGS. 10 and 11. In other examples, only one of the numerical indicator or the graphical shutdown timer indicator is displayed at a time.

As discussed, mobile device 150 (FIG. 1B) may have an application that allows data to be exchanged between the mobile device 150 and the utility controller 102. A duration of the shutdown timer may be displayed within an interface of the application on the mobile device 150 in a similar manner as discussed with respect to FIGS. 8, 9, 10, and 11. For example, a shutdown timer within an application on mobile device 150 may cause the display on the mobile device 150 of a similar graphical and/or numerical indicator as shutdown timer indicator 220. In examples where the mobile device 150 comprises a registered RFID tag that is detected by touchless utility controller 102 to initiate a shutdown timer, the initial shutdown timer duration (and/or remaining shutdown timer duration) may be displayed on the mobile device in a similar manner as described with respect to shutdown timer indicator 220.

Figure 12:
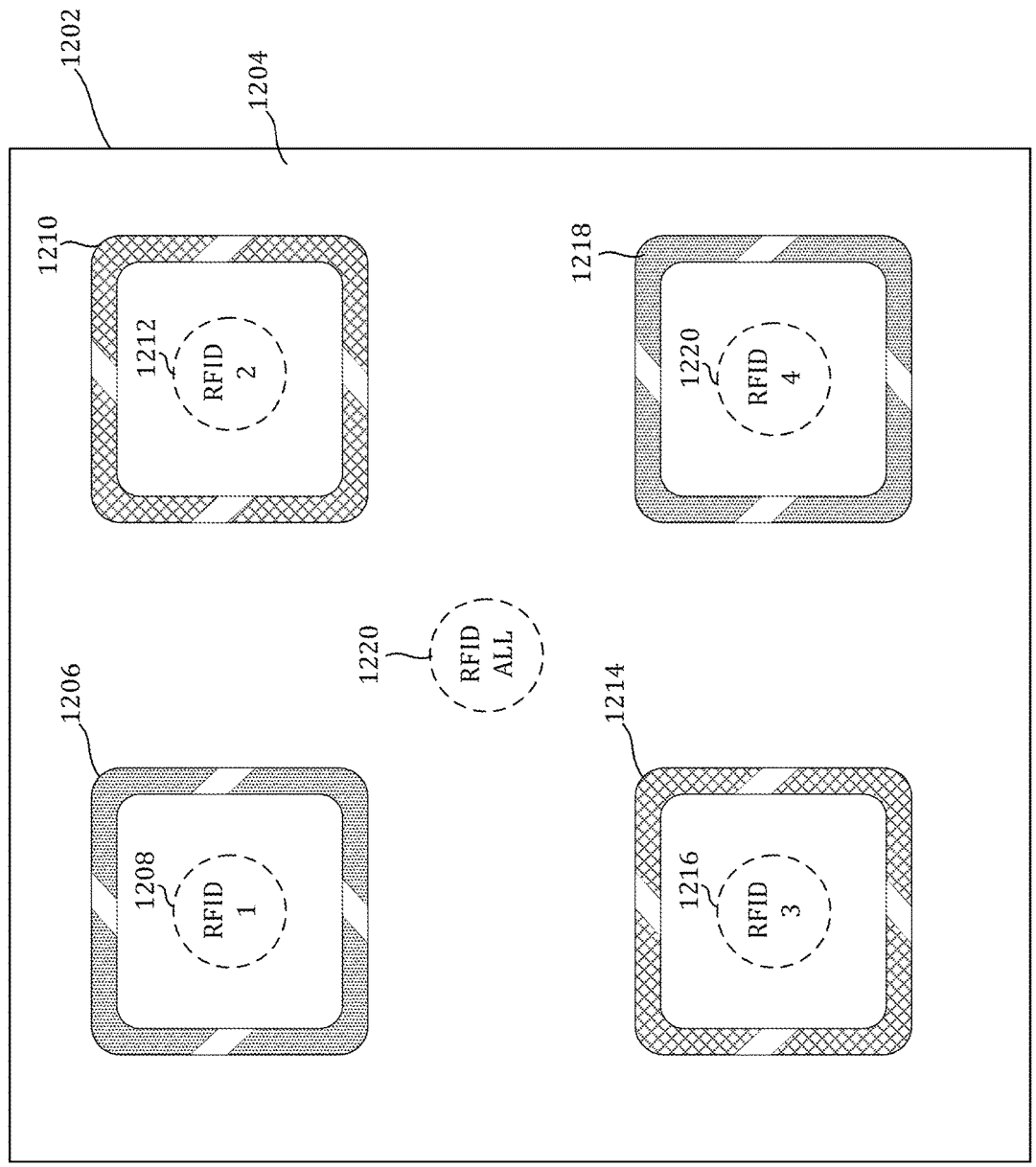
FIG. 12 depicts a front view of a touchless utility controller with multiple RFID readers and visual indicators for different utilities.

FIG. 12 depicts a front view of a touchless utility controller 1202 with multiple RFID readers and visual indicators for different utilities. In some examples, the utility controller 1202 is capable of selectively controlling different utilities through different activation points on the front face 1204 of the utility controller. For instance, a first portion of the front face 1204 may include a first visual indicator 1206 and a first RFID reader 1208, a second portion of the front face 1204 may include a second visual indicator 1210 and a second RFID reader 1212, a third portion of the front face 1204 may include a third visual indicator 1214 and a third RFID reader 1216, and a fourth portion of the front face 1204 may include a fourth visual indicator 1218 and a fourth RFID reader 1220. While multiple RFID readers are shown as being placed in the various positions, the functionality may be achieved by including different antennas for an RFID reader at each corresponding location and using common RFID reader circuitry. Also, it should be appreciated that the respective RFID readers/antennas are located within the housing or on the interior of the front face 1204 and the positions shown in FIG. 12 are for reference as to relative position to the front face 1204.

Each of the RFID readers and visual indicators in FIG. 12 may function substantially similarly to the RFID readers and visual indicators discussed above but for control of separate valves and/or utilities. For instance, scanning a registered RFID tag at the position of the first RFID reader 1208 causes the utility controller 1202 to send an activation signal to a first valve to control a first utility. When the corresponding first utility is in the active state, the first visual indicator 1206 is illuminated with a first color (e.g., green) indicating the active state of the first utility/valve. When the corresponding first utility is in the inactive state, the first visual indicator 1206 is illuminated with a second color (e.g., red) indicating the inactive state of the first utility/valve. Similarly, scanning a registered RFID tag at the position of the second RFID reader 1212 causes the utility controller 1202 to send an activation signal to a second valve to control a second utility, which may be the same or different type of utility as the first utility. The second visual indicator 1210 is similarly illuminated to convey state information about the second utility/valve.

In some examples, a fifth or full-control RFID reader 1220 may be included that may be used for activation or deactivation of all the utilities within the control of the utility controller 1202. For example, scanning a registered RFID card at the position of the full-control RFID reader 1220 may result in activation or deactivation of all the controlled utilities/valves. Upon such activation/deactivation, all the visual indicators 1206, 1210, 1214, 1214 may be illuminated with the corresponding changed state of the utility.

The different utilities corresponding to the different RFID readers may be controlled with common RFID tags or separate RFID tags. In an example where a common RFID tag may be used, one RFID tag may be used to activate/deactivate any of the utilities controlled by the utility controller 1202. In other examples, one RFID tag may be able to control only one (or a subset) of the available utilities and another RFID tag may be able to control another (or another subset) of the available utilities. For example, a scan of an RFID tag at the first RFID reader 1208 may cause activation/deactivation of the first utility, but a scan of that same RFID tag at the second RFID reader 1212 may not cause activation/deactivation of the second utility. Instead, a second RFID tag may be needed to activate/deactivate the second utility.

Where different utilities are controlled by the different RFID readers, the colors displayed by the respective visual indicators may be different to indicate the different type of utility being controlled. As an example, the first visual indicator 1206 may display a blue color when active to indicate that a water utility is being controlled through interaction with the first RFID reader, and the second visual indicator 1210 may display a yellow color when active to indicate that a gas utility is being controlled.

Figure 13:
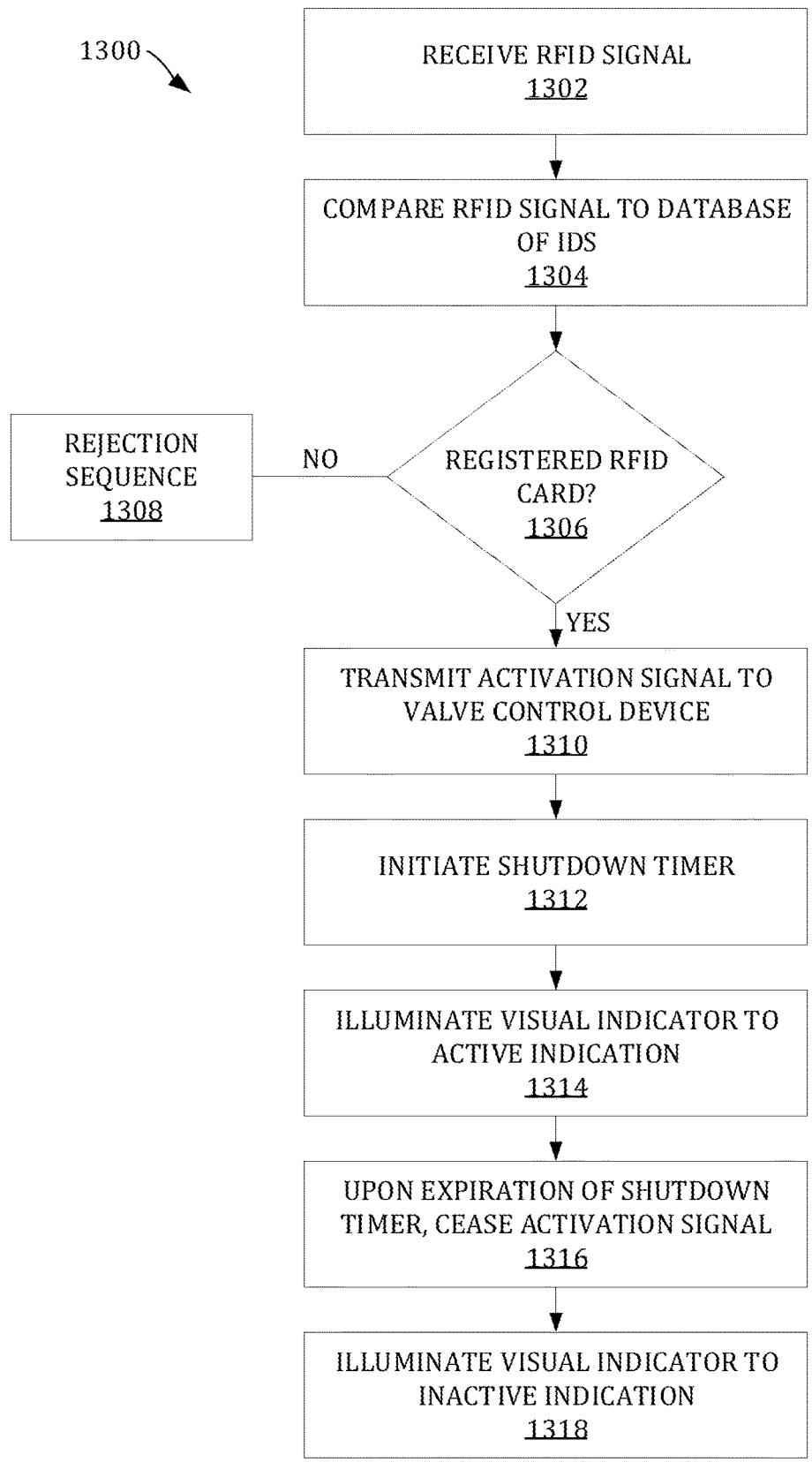
FIG. 13 depicts an example method for controlling a utility with a touchless utility controller.

FIG. 13 depicts an example method 1300 for controlling a utility with a touchless utility controller. At operation 1302, an RFID signal is received or detected by an RFID reader of the utility controller. The RFID signal is received from an RFID tag of a set of RFID tags. The RFID signal includes a unique identifier for the RFID tag from which the RFID signal was received.

At operation 1304, the received RFID signal is compared to a list or database of registered unique identifiers. The database or list of unique identifiers may be stored in the local memory of the utility controller or remotely from the utility controller. At operation 1306, based on the comparison performed in operation 1304, a determination is made as to whether the received RFID signal corresponds to a registered RFID tag. For example, if the unique identifier of the received RFID signal matches a unique identifier in the list of registered unique identifiers, the RFID tag may be determined to be a registered RFID tag. If the unique identifier of the received RFID signal does not match a unique identifier in the list of registered unique identifiers, the RFID tag may be determined to not be a registered RFID tag.

If the RFID tag is determined to not be a registered RFID tag in operation 1306, the method 1300 flows to operation 1308 where a rejection sequence is performed. The rejection sequence may be a flashing of the visual indicator or other illumination sequence of the visual indicator to indicate that the detected RFID tag has been rejected. An audible indicator may also or alternatively be sounded. If the RFID tag is determined to be a registered RFID tag in operation 1306, the method 1300 flows to operation 1310.

At operation 1310, in response to the determination that the RFID tag is a registered RFID tag, an activation signal is transmitted from the utility controller to a valve control device of a valve that controls a utility (e.g., the flow of water or gas). Transmission of the activation signal causes the corresponding valve to open to allow the flow of the fluid, such as gas or water.

At operation 1312, a shutdown timer is also initiated. For instance, upon activating the utility, the shutdown timer begins for a set duration. The set duration of the shutdown timer may be a setting of the utility controller. In other examples, the set duration of the shutdown timer may be dependent on the RFID card that was scanned. For example, one RFID tag may cause activation of a utility and a shutdown timer of a first set duration to initiate, and another RFID tag may cause activation of a utility and a shutdown timer of a second set duration to initiate. The value for the set duration may be included in the data of the RFID signal received from the RFID tag, or the value for the set duration may be accessed via a query or lookup function. For instance, a first set of RFID tags may be associated in a list or database with a first set duration, a second set of RFID tags may be associated with a second set duration, and a third set of RFID tags may be associated with a third set duration.

In addition, at operation 1314, the visual indicator is illuminated to an active or "on" indication to indicate the active state of the utility. For instance, the visual indicator may be illuminated with a first color (e.g., green) to indicate the corresponding utility is active.

At operation 1316, upon expiration of the shutdown timer, the utility controller causes the corresponding utility to become inactive (e.g., cause the valve to close). For instance, the transmission and/or generation of the activation signal may be ceased. Cessation of the activation signal causes the utility to be inactive. For instance, cessation of the activation signal causes the valve to close, which prevents the flow of fluid through the valve. In some examples, the activation signal is transmitted for the entire duration of the shutdown timer (unless another deactivation condition occurs prior to the expiration of the shutdown timer). At operation 1318, upon inactivation of the corresponding utility, the visual indicator is illuminated to an inactive or "off" indication to indicate the inactive state of the utility. For instance, the visual indicator may be illuminated with a second color (e.g., red).

Figure 14:
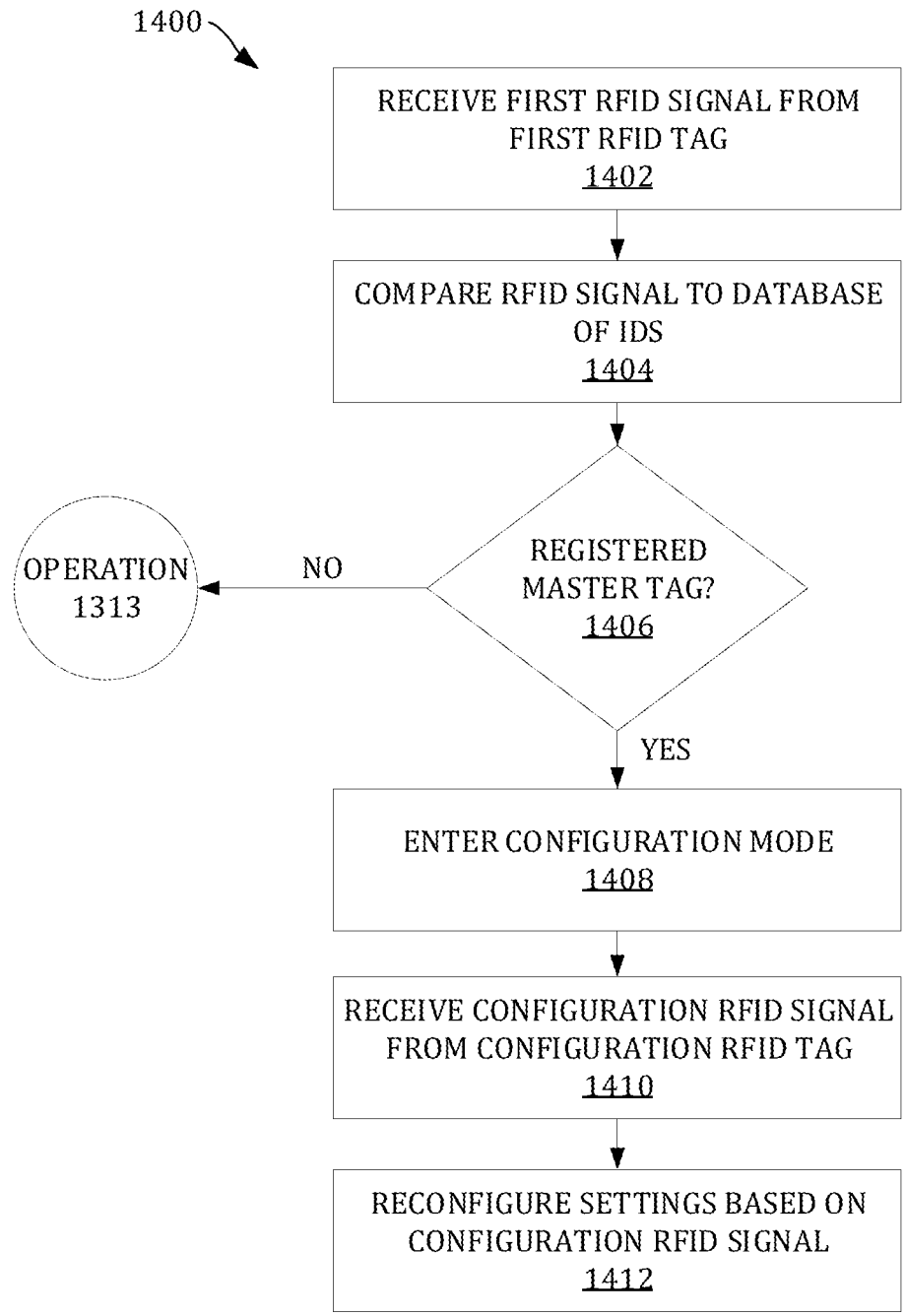
FIG. 14 depicts an example method for configuring a touchless utility controller.

FIG. 14 depicts an example method 1400 for configuring a touchless utility controller. At operation 1402, an RFID signal is received or detected by an RFID reader of the utility controller. The RFID signal is received from an RFID tag of a set of RFID tags. The RFID signal includes a unique identifier for the RFID tag from which the RFID signal was received.

At operation 1404, the received RFID signal is compared to a list or database of registered unique identifiers for master RFID tags. The database or list of unique identifiers of master RFID tags may be stored in the local memory of the utility controller or remotely from the utility controller. At operation 1406, based on the comparison performed in operation 1404, a determination is made as to whether the received RFID signal corresponds to a master RFID card. For example, if the unique identifier of the received RFID signal matches a unique identifier in the list of unique identifiers for master RFID tags, the RFID tag may be determined to be a master RFID tag. If the unique identifier of the received RFID signal does not match a unique identifier in the list of unique identifiers for master RFID tags, the RFID tag may be determined to not be a master RFID tag.

If the RFID tag is determined to not be a master RFID tag in operation 1406, the method 1400 may end or may flow to operation 1313 of method 1300 in FIG. 13 where the received RFID signal is compared to a list of unique identifiers for activation/deactivation RFID tags. If the RFID tag is determined or detected to be a master RFID tag in operation 1406, the method 1400 flows to operation 1408.

At operation 1408, in response to the determination that the RFID tag is a master RFID tag, the utility controller enters a configuration mode. Entering the configuration mode may also include illuminating a configuration sequence or a third color on the visual indicator to indicate that the utility controller has entered the configuration mode. During the configuration mode, the utility controller awaits a scan or detection of a configuration RFID card. The configuration mode may have a set duration (e.g., 10 seconds), and upon expiration of the set duration, the utility controller exits the configuration mode and returns to its prior state before the master RFID tag was detected.

At operation 1410, a configuration signal RFID signal is received by the RFID reader from a configuration RFID tag (e.g., a configuration RFID tag is detected). The configuration RFID signal may include a unique identifier and/or configuration data for one or more settings. For example, based on the unique identifier in the configuration RFID signal from the configuration RFID tag, the utility controller 102 may perform a local lookup to determine a corresponding settings change that should be made. In other examples, the configuration RFID signal may include data directly indicating the settings change that should be made. For instance, the configuration RFID data may include a set duration (e.g., 4 hours, 6 hours, 8 hours, 12 hours) for the shutdown timer. Accordingly, scanning different configuration RFID cards may cause different settings to be changed or the same setting to be changed to a different value. At operation 1412, the utility controller reconfigures the settings based on the configuration RFID signal that was received in operation 1410.

In some examples, while in the configuration mode, new RFID tags may be registered with utility controller 102. For example, while the utility controller is in the configuration mode, a new RFID tag with a new unique identifier may be scanned (e.g., detected) and the that new unique identifier may be added to the list of registered unique identifiers. Thus, after the registration occurs, the new RFID tag may be used to activate or deactivate the utility controlled by the utility controller.

While RFID technology is primarily discussed as being used above, in some examples other forms of wireless communication may be used. For instance, longer range radio-frequency communication may also be used that operate in the ultra-high frequency range (UHF) (e.g., 300 MHz to 3 GHz). The radio frequency may operate in the band between 300 MHz to 1 GHz or 300 MHz to 400 MHz. In such examples, instead of RFID tags being used for activation, RF remote controls may be used, with each RF remote control emitting a unique identifier to allow for distinguishing remote in a manner similar to distinguishing RFID tags. The utility controller may then include a corresponding RF receiver. In other examples, the wireless communication may be accomplished by infrared control. For instance, instead of RFID tags being used for activation, infrared remote controls may be used, with each infrared remote control emitting a unique identifier to allow for distinguishing the remote controls in a manner similar to distinguishing RFID tags. The utility controller may then include a corresponding infrared receiver. More generally, the utility control systems may include a wireless receiver (e.g., RFID reader, RF receiver, IR receiver) and a set of wireless transmitters (e.g., RFID tags, RF remotes, IR remotes).

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurement techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for controlling a utility, the system including:
an RFID reader;
a visual indicator;
a processor; and
memory, storing a list of registered unique identifiers and storing instructions that, when executed the processor, cause the system to perform operations including:
receiving, by the RFID reader, an RFID signal from an RFID tag, the RFID signal including a unique identifier, wherein the RFID tag is one of a set of RFID tags that includes a master RFID tag and a configuration RFID tag;
comparing the unique identifier to the list of registered unique identifiers to determine that the RFID tag is a registered RFID tag;
in response to determining the RFID tag is a registered RFID tag:
transmitting an activation signal to a valve control device to cause a valve controlling a utility to open;
illuminating the visual indicator to a first color; and
initiating a shutdown timer; and
upon expiration of the shutdown timer:
ceasing the transmission of the activation signal; and
illuminating the visual indicator to a second color;
detecting the master RFID tag;
in response to detecting the master RFID tag, entering a configuration mode;
while in the configuration mode, detecting the configuration RFID tag; and
based on the detection of the configuration RFID tag, modifying one or more settings of the system.

2. The system of claim 1, wherein the first color indicates the utility is active and the second color indicates the utility is inactive.

3. The system of claim 1, wherein the RFID reader, the visual indicator, the processor, and the memory are housed within a housing, wherein the housing includes no physically activated interface elements.

4. The system of claim 3, wherein the visual indicator illuminates at least 10% of a surface area of a face of the housing.

5. The system of claim 3, the visual indicator changes to indicate an amount of time remaining on the shutdown timer.

6. The system of claim 3, wherein the system further includes a shutdown timer indicator that changes to indicate an amount of time remaining on the shutdown timer.

7. A touchless utility controller comprising:
a housing encompassing:
circuitry configured to receive a signal from an RFID tag, and based on the received signal, provide an activation signal to a valve control device for a valve;

wherein the housing comprises:
a face having an illuminated portion to allow for a visual indictor to illuminate the illuminated portion, wherein the face does not include any physically activated interface elements; and
at least one of an outer side perimeter connected to the face or a back side;
wherein at least one of the outer side perimeter or the back side defines at least one through hole for receiving a input power wiring and output transmission wires for connecting to the valve control device for the valve controlling one of gas or water.

8. The utility controller of claim 7, wherein the illuminated portion has a surface area that is at least 10% of a surface area of the face.

9. The utility controller of claim 7, further comprising an RFID reader, a memory, and a processor housed in the housing.

10. The utility controller of claim 7, wherein the face has a width, and an outer edge of the illuminated portion is positioned within 20% of the width from all exterior edges of the face.

11. The utility controller of claim 7, wherein the housing does not include any physically activated interface elements.

12. A method for controlling a utility, the method comprising:
receiving, by an RFID reader of a utility controller, a first RFID signal from a first RFID tag;
comparing, by a processor of the utility controller, the first RFID signal to a list of registered unique identifiers to determine that the first RFID tag is a registered RFID tag;
in response to determining the first RFID tag is a registered RFID tag:
transmitting an activation signal to a valve control device to cause a valve controlling a utility to open;
illuminating a visual indicator to a first color; and
initiating a shutdown timer;
receiving, by the RFID reader, a second RFID signal from a second RFID tag;
comparing, by the processor of the utility controller, the second RFID signal to the list of registered unique identifiers to determine that the second RFID tag is a registered RFID tag; and in response to determining the second RFID tag is a registered RFID tag:
ceasing the transmission of the activation signal; and
illuminating the visual indicator to a second color.

13. The method of claim 12, further comprising:
receiving, by the RFID reader, a third RFID signal from a third RFID tag;
based on the third RFID signal, determining that the third RFID tag is a master RFID tag;
entering a configuration mode in response to determining that the third RFID tag is a master RFID tag;
while in the configuration mode, receiving, by the RFID reader, a fourth RFID signal from a fourth RFID tag;
comparing, by the processor of the utility controller, the fourth RFID signal to the list of registered unique identifiers to determine that the fourth RFID tag is not a registered RFID tag;
in response to determining the fourth RFID tag is not a registered RFID tag, adding the fourth RFID tag as a registered RFID tag to the list of registered unique identifiers.

14. The method of claim 12, wherein a duration of the shutdown timer is based on the first RFID signal.

15. The method of claim 12, wherein the first color indicates the utility is active and the second color indicates the utility is inactive.

16. The method of claim 12, wherein the RFID reader, the visual indicator, and the processor, are housed within a housing, wherein the housing includes no manually activated interface elements.

17. The method of claim 16, further comprising:
receiving, by the RFID reader of the utility controller, a third RFID signal;
in response to receiving the third RFID signal:
transmitting a second activation signal to the valve control device to cause the valve controlling the utility to open;
receiving an emergency shutdown signal;
in response to receiving the emergency shutdown signal, ceasing the transmission of the activation signal;
receiving an emergency override signal; and
transmitting, only in response to the emergency override signal, a third activation signal to the valve control device to cause the valve controlling the utility to open.

18. The method of claim 12, wherein the second RFID signal is received prior to expiration of the shutdown timer.

* * * * *